United States Patent

[11] 3,615,310

| | | |
|---|---|---|
| [72] | Inventor | David M. Long<br>Mount Lebanon, Pa |
| [21] | Appl. No. | 829,289 |
| [22] | Filed | June 2, 1969 |
| [45] | Patented | Oct. 26, 1971 |
| [73] | Assignee | PPG Industries, Inc.<br>Pittsburgh, Pa.<br>Continuation-in-part of application Ser. No. 749,847, Aug. 2, 1968, now abandoned. |

[54] METHOD FOR DRYING GLASS FIBER FORMING PACKAGES
12 Claims, 6 Drawing Figs.

[52] U.S. Cl. ................................................ 65/2,
34/15, 34/92, 65/3, 34/51
[51] Int. Cl. ........................................................ C03b 37/00
[50] Field of Search ............................................ 65/1, 2, 11,
3; 34/15, 92, 49, 51

[56] References Cited
UNITED STATES PATENTS

| 2,101,461 | 12/1937 | Stienen | 34/92 X |
|---|---|---|---|
| 2,403,800 | 7/1946 | Hoyler | 34/92 X |
| 3,281,223 | 10/1966 | Simison | 65/11 W |
| 3,369,926 | 2/1968 | Eakins | 65/3 X |
| 2,132,095 | 10/1938 | Broughton | 34/15 |
| 3,262,212 | 7/1966 | De Buhr | 34/15 |
| 3,230,633 | 1/1966 | Hamilton | 34/15 |

Primary Examiner—S. Leon Bashore
Assistant Examiner—Robert L. Lindsay, Jr.
Attorney—Chisholm and Spencer ABSTRACT: Glass fiber strand forming packages are dried in a heated chamber at subatmospheric pressure in order to condition the strand for subsequent fabrication into roving and yarn. The temperature employed is above freezing temperature but below the temperature at which harmful changes to the forming size on the strand occurs. The time for conditioning is substantially reduced and the tendency for the size to migrate is substantially reduced. The moisture content on the strand in a plurality of forming packages is reduced to a uniform low percentage from package to package as well as throughout each package.

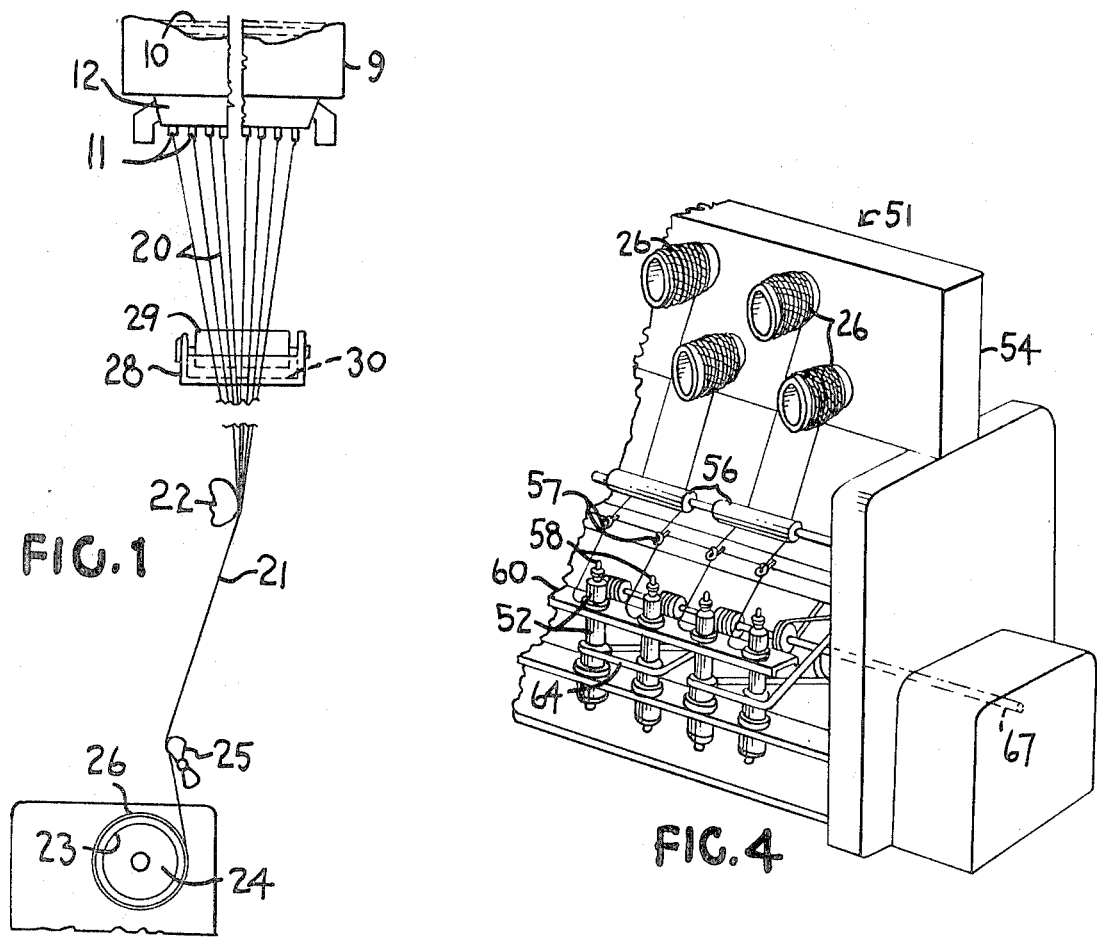
FIG. 1
FIG. 4
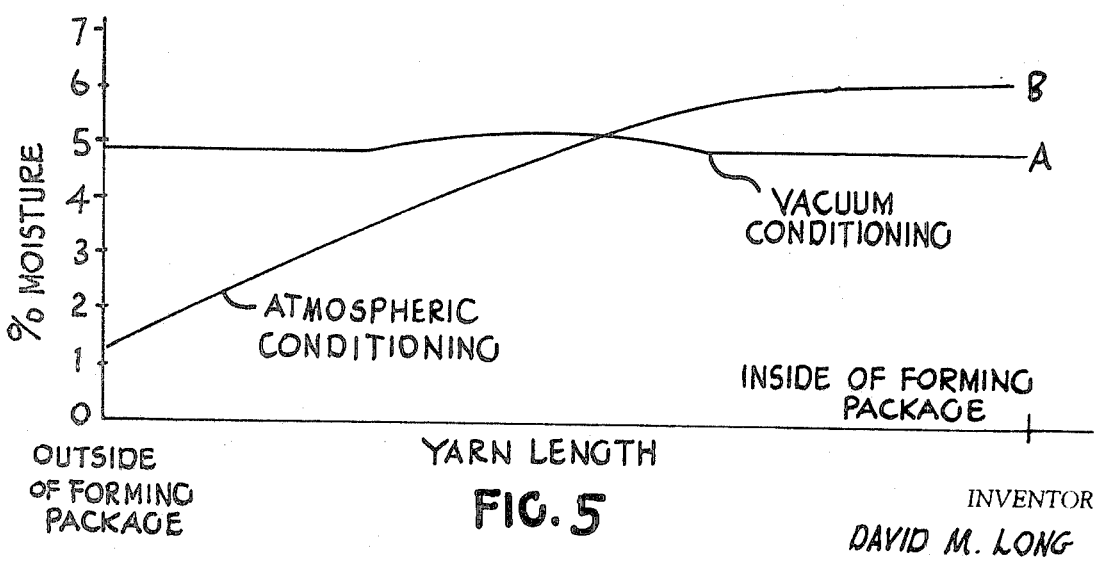
FIG. 5
INVENTOR
DAVID M. LONG
BY
ATTORNEYS

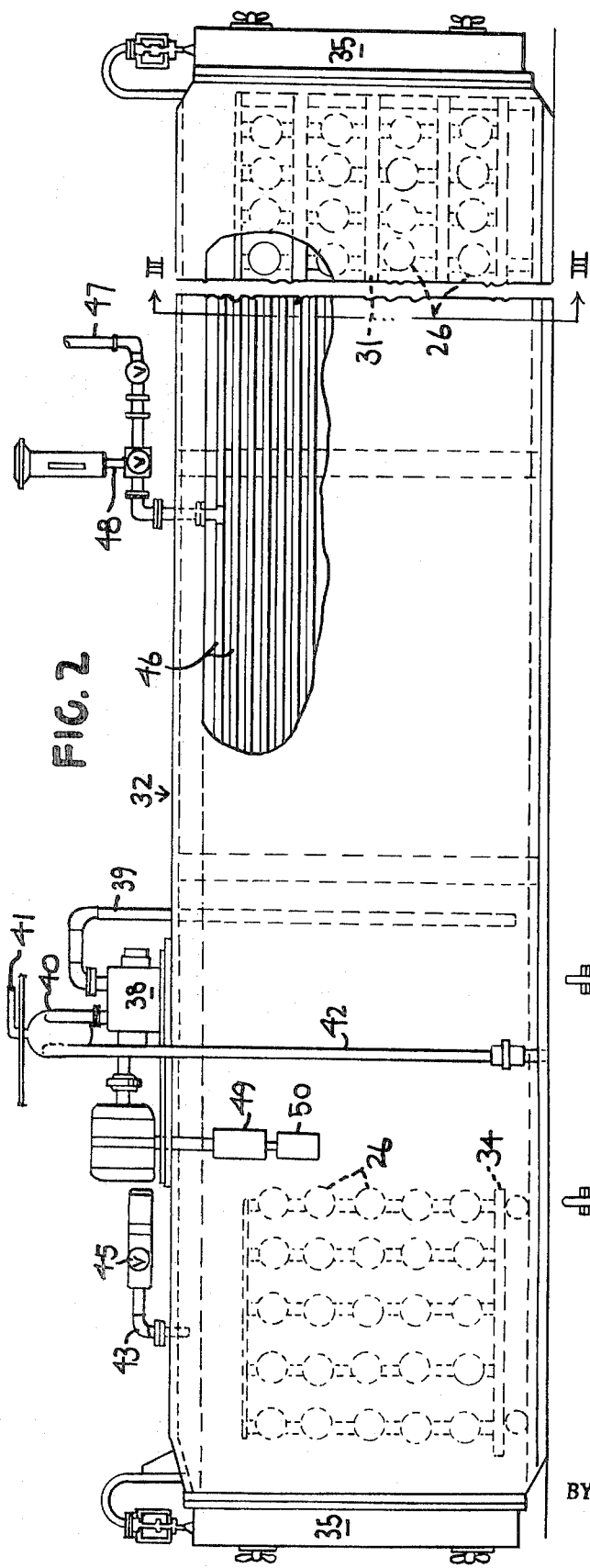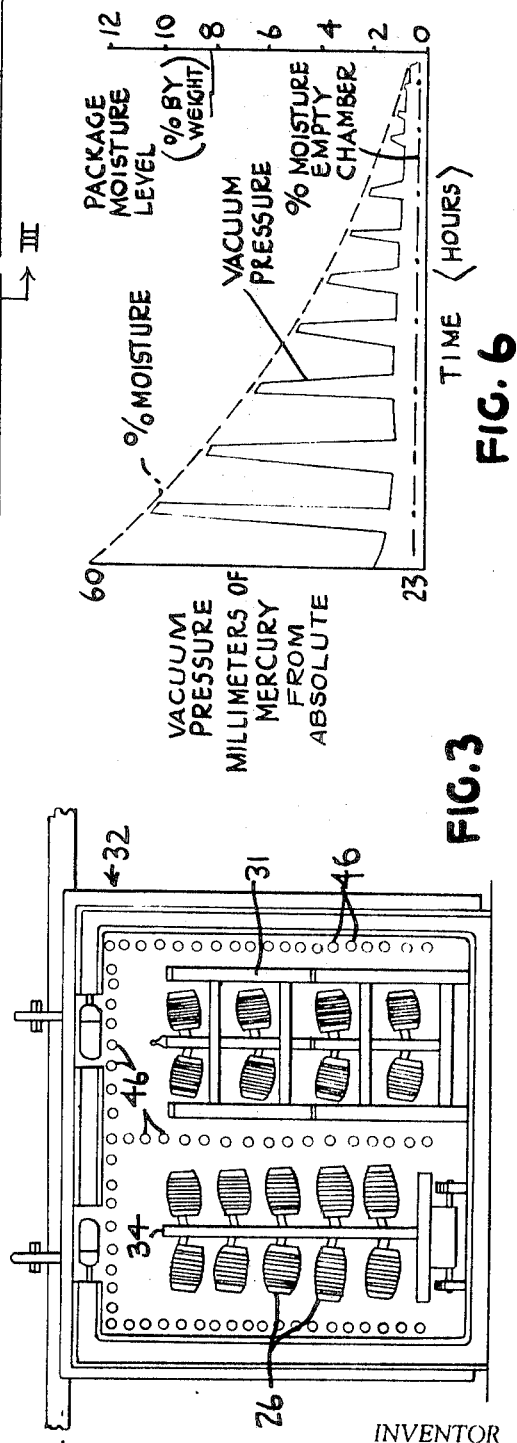

METHOD FOR DRYING GLASS FIBER FORMING PACKAGES

CROSS-REFERENCE TO RELATED APPLICATION

This is a continuation-in-part of application Ser. No. 749,847 filed Aug. 2, 1968 now abandoned.

BACKGROUND OF THE INVENTION

1. Field of the Invention

This invention relates to the conditioning, i.e., moisture removal, of glass fiber strand on a forming package prior to fabrication into roving or prior to twisting and plying the strand to form glass textile yarn. It has particular relation to the conditioning of large forming packages having substantial thicknesses of heavy strand, i.e., 400 or more fibers each having a diameter of 0.0002 inch and larger.

2. Description of the Prior Art

In the production of continuous filament glass fiber strands, a number of glass fibers are drawn from an electrically heated platinum alloy bushing containing a molten supply of the glass. The glass passes through tips which define orifices in the bottom of the bushing and form inverted cones of glass at the ends of the tips. Individual fibers are drawn from the cones of glass at a high rate of speed, i.e., 5,000 to 20,000 feet per minute, and are grouped into a strand as they pass over a suitable guide. The strand is thereafter wound on a rapidly rotating paper forming tube.

There is no twist in the strand as it is thus formed. An aqueous size composed of an aqueous dispersion or emulsion of a binder and a lubricant is applied to the individual fibers as they are formed. Starch or polyvinyl acetate are frequently employed as the binder ingredient and an animal or vegetable oil is employed as a lubricant. The binder holds the fibers together in the strand and the lubricant permits the fibers to rub against each other and against guides and traverses without breaking due to abrasion.

It is common practice to use glass fiber strands and glass fiber cloth as a reinforcement for resins. For such use, the glass fibers are coated with a coupling agent or finish material which makes the surface of the glass fibers substantive and compatible with the particular resins with which they are to be employed. These coupling agents greatly increase the dry and wet physical strengths of the glass fiber resin laminate.

When the glass fibers are used in the form of strand, i.e., roving or chopped strand or twisted strand, for resin reinforcement, the coupling agent is usually combined with the size and applied with the size to the fibers during their formation. The size employed is usually an aqueous dispersion of a film forming, synthetic binder, and a glass fiber lubricant.

Roving is formed by combining a number of strands in parallel form and winding the strands on a tubular support in a manner such that the combined strands may be unwound and used to form woven roving or chopped strands. Twisted strand (single end on a bobbin) is made according to conventional textile twisting techniques by removing the strand from the forming package and winding it on a twister bobbin. It is therefore necessary that the strand have good integrity and resistance to fuzzing during the steps employed to make the twisted strand or roving and fabricate them into forms suitable for use as a textile material or a resin reinforcement.

The solids (nonaqueous) content of the size is about 6 to 7 percent by weight with the remainder being water. The amount of size applied to the strand is about 12 to 14 percent by weight of the strand and size. Substantially all of the moisture must be removed from the strand on the forming package prior to it being formed into roving, chopped strand or mat for resin reinforcement. This has been accomplished in hot air drying ovens at a temperature of 260°–280° F. for 6 8 hours. This heating also serves to cure any curable resin binder in the size or to affix the coupling agent in the size to the glass fiber. This affixation occurs after substantially all of the moisture is removed from the strand so that the coupling agent reacts with bound water on the surface of the glass fibers as contrasted to unbound water.

Some of the water (moisture) must be removed from the strand on the forming package prior to twisting of the strand to produce yarn. It has been conventional to reduce the moisture level to about 5 to 7 percent by weight of the strand and size. Moisture is removed from the strand in the twisting operation as the strand passes from the forming package to the twister tube; however, this removal is usually not sufficient to permit the production of a good twisted yarn. The forming packages are thus conventionally conditioned prior to twisting by allowing them to sit in the factory in an area of relatively high humidity for a short period of time, i.e., several hours.

The trend in the manufacture of glass fiber strand has been to larger forming packages in order to reduce handling costs and to increase the output of the strand forming equipment. Larger forming packages 12 inches in length and 12 inches in diameter are employed to collect 105,000 to 120,000 yards of strand weighing from 14 to 16 pounds. The thickness of the strand package collected on the larger forming tubes is as much as five-eighths to three-quarter inches. Also, there has been a demand for strands of a greater number of fibers than the 204 fibers that formed the conventional strand for many years. Strands composed of 400, 600, 800 and 1,200 fibers are now regular commercial products. The drying of the larger forming packages of the heavier strands requires a substantial amount of time when done according to conventional practices. For example, a forming package of G–75 strand weighing 16 pounds with a package thickness of three-fourths inches can take as long as 60 hours at room temperature to dry. This is entirely too long for it requires too much valuable factory space to dry a large number of such forming packages.

Another problem which occurs in the drying of forming packages is that of "size migration." "Size migration" is a phenomenon which occurs in the strand when it is dried while it is wound on the forming tube. As the strand is dried, the water moves from the inside of the forming package next to the tube to the outside of the tube. This movement of the water carries with it some of the binder and lubricant of the size so that the strand in the outside of the package has a much higher size solids content than the strand in the layers beneath the surface.

Size migration creates a number of problems in subsequent fabrication of the strand. In the formation of roving and in the twisting, plying, warping, quilling and weaving of glass fiber yarn there are a number of winding and unwinding operations where the tension exerted on the yarn is important. The tension exerted on the yarn during these operations must be relatively constant. If the tension on the yarn is uneven during these operations, the individual filaments making up the yarn are likely to be broken and produce fuzzy yarn. Fuzzy yarn clogs up the fabricating equipment and causes yarn breakout. Uneven tension on the yarn can be created by nonuniform size content on the yarn throughout its length. Thus, it is desired that the size content on the yarn be uniform throughout its length.

Another fabricating operation where uneven size content on the yarn is troublesome is in the process of texturing yarn. Textured yarns are those continuous filament yarns which have been bulked by an air jet such as described in U.S. Pat. No. 2,783,609. The size content of the yarn which is textured determines the resistance of the yarn to being textured or bulked by the air jet. A variation in size content along the length of the yarn results in a variation in the degree of bulking. Any variation in the degree of bulking of the yarn shows up in the fabric and may be serious enough to result in rejection of the piece of goods.

An additional problem due to size migration is encountered when woven fabrics are heat treated. The strand with the higher size solids content shows up differently than the strand with the lower size solids content when the twisted strand is woven into a fabric and the fabric is heated to remove the size and set the fibers in the fabric. This heating is conducted at a temperature of about 1,200° to 1,400° F. for 30 to 40 seconds and is sufficient to volatilize the solids and remove them from the fabric and to soften the fibers in the fabric to set them in their new position. This process is described in greater detail in U.S. Pat. No. 2,845,364. After the heat treatment, the strand from the outside of the forming package which originally had the higher size solids contents shows up as a band in the fabric which reflects light to a different degree than the rest of the fabric. Sometimes this band exhibits a moire effect. This results in an imperfection in the fabric which is of sufficient magnitude to cause rejection of the piece of goods. It is not known exactly what causes the difference in the yarn in the fabric; however, it is believed that it may be due to incomplete removal of the size or it may be due to a difference in the orientation of the individual filaments in the yarn due to the increased heating activity which occurs in the areas of increased size solids content when the fabric has been sufficiently heated to remove all of the size throughout the fabric. In any event, this difference has definitely been noted and has been a cause for serious concern with the yarn manufacturers and weavers. The above defects have also occurred in fabrics woven with textured, continuous filament glass yarns.

As can be surmised from the description above concerning the defects in woven fabrics caused by "size migration," this problem has been a most serious problem and has required drastic steps to overcome it. These steps have involved the stripping or running off of the strand on the outside of the forming package to remove that portion of the forming package which contains strand having a higher size content than the remainder of the package. This represents a substantial loss in the production of strand and also requires a costly and undesirable intermediate step between the forming and twisting of the strand.

It is therefore a desideratum of the art to be able to condition forming packages of glass fiber strand in a reasonably short time to a level suitable for further fabrication of the strand upon removal from the package without causing size migration during the conditioning. It is also necessary that the level of moisture in the strand be substantially the same in each forming package so that there is uniformity of operating conditions in the twisting and other fabricating operations. This permits the production of a uniform quality product.

One approach to the solution of the problems in yarn twisting set forth above is described in U.S. Pat. No. 3,206,924. The patent describes a method wherein uniformity of moisture content in the forming packages is obtained by restricting the amount of moisture that is removed from the strand while on the forming package and then twisting the strand in an under saturated atmosphere. The restriction of the moisture removal is accomplished by holding the forming package in special high humidity storage rooms until twisting. The recommended moisture level of the strand as it is mounted on the twist frame in the patented procedure is 9 percent. This is desired, according to the patent, to prevent premature setting of the size on the strand which is supposed to result in poor strand integrity, binder migration, wild yarn, fiber breakage (fuzzing) and sloughing of the yarn from the yarn package.

SUMMARY OF THE INVENTION

In accordance with the present invention, glass fiber strand on a forming package is conditioned at a much faster rate for subsequent fabrication by drying the strand on the package at subatmospheric pressure and an elevated temperature, i.e., above freezing temperature. The temperature of the strand forming package is maintained sufficiently high to prevent freezing of the moisture in the package at the subatmospheric pressure but is not so high as to chemically degrade any of the nonaqueous ingredients in the size.

The conditioning of the forming package is preferably accomplished in a vacuum chamber in which a vacuum of at least 20 inches of mercury from atmospheric pressure at sea level, preferably 24 to 28 inches of mercury from atmospheric pressure at sea level is maintained. Under such vacuum conditions the temperature of the forming package should be at least 100° F. and preferably in the range of 110° to 300° F.

The time required for conditioning depends upon the moisture level in the packages at the beginning of the conditioning and upon the final level desired in the forming packages. For roving, the moisture level should be very low, i.e., below 1 percent by weight, preferably below 0.2 percent by weight of the sized strand. For some aqueous starch and oil sizes, a level of 3 to 5 percent by weight based upon the weight of the forming package is preferable; however, for other starch sizes it may be desirable to have a much lower level. For example, lower levels, i.e., as low as 0.5 percent by weight of moisture based upon the weight of the forming package may be desirable for some sizes based upon the moisture retention characteristics of the size. For such sizes it is especially desirable that the yarn on the twister tube not be too wet. In such case, the film forms on the fibers and tends to bind the yarn together on the twister tube. When the yarn is removed, the fibers tend to break and objectionable fuzz and ringers are formed. In any event, it is desirable to condition the forming package so that wet yarn does not result on the twister tube. Wet yarn on a twister tube can cause various problems depending upon whether it is used right away or after it has dried. If used right away, wet yarn, depending on the degree of wetness, has a different tension effect upon being unwound for further use and this results in slack ends or tight ends which result in broken fibers and eventual breakage of the yarns. If the wet yarn package is not used right away and the binder ingredient in the size cures or adheres while the yarn is on the tube, adhesion of yarn to itself occurs and it is difficult to remove from the yarn package. Ringers occur as mentioned above and eventual yarn breakage occurs.

The uniform level of moisture in the forming package after conditioning according to the present invention is a most beneficial result of the practice of the invention. This is accomplished whether the final moisture level is relatively high, i.e., 5 to 9 percent by weight of the forming package or relatively low, i.e., 3 to 0.5 percent or less by weight of the forming package. Uniform moisture levels of 3 to 5 percent by weight are preferred for some starch and oil sizes. By uniform level is meant a variation of less than 1 percentage point of moisture plus or minus a given moisture level percentage, preferably less than one-half percentage point plus or minus the given desired moisture level. Such uniformity permits ease of handling due to lack of tension variations in the strand and resultant yarn. It also permits better control of the time and amount of film forming and binding effect of the size and avoidance of all of the attendant problems due to lack of binding, too much binding or uneven binding. This uniformity is desirable from package to package of the same type of strand or yarn as well as within each package.

The invention is applicable to the conditioning of all sizes of strand and fibers in the strand. It is particularly useful in the conditioning of strand composed of at least 400 fibers and having a fiber diameter in excess of 0.0002 inch in diameter, for Example D (0.00021 inch), DE (0.00025 inch), E (0.00029 inch), G (0.00036 inch), H (0.00042 inch), K (0.00042 inch) and P (0.0007). The choice of 400 fibers or more per strand as representative of the best use of the invention is an arbitrary choice based upon the conventional strands commercially produced such as 200, 400, 600, 800 and 1,200 fibers per strand. Obviously, the invention is applicable to strands having 375 or 350 fibers per strand and any such limitation as to number of fibers per strand in the claims should not be considered as defining a sharp dividing line identifying the limits of the usefulness of the invention, but only to indicate the preferred mode of use of the invention.

BRIEF DESCRIPTION OF THE DRAWINGS

The invention and its advantages are described in greater detail in conjunction with a description of a preferred mode of carrying out the invention and a description of the drawings in which:

FIG. 1 is a diagrammatic elevation of a conventional glass fiber strand forming operation;

FIG. 2 is an elevation of a heated vacuum chamber containing strand forming packages;

FIG. 3 is a sectional view taken along lines III—III of FIG. 2;

FIG. 4 is a perspective view of conventional apparatus for twisting the strand from forming packages into yarn;

FIG. 5 is a graphic representation of the moisture level in forming packages conditioned according to the prior art and according to the present invention, and FIG. 6 is a graphic representation of the vacuum pressure variation in the vacuum chamber during the final 4 hours of conditioning.

IN FIG. 1 of the drawing there is shown a glass melting furnace or forehearth 9 thereof containing a supply of molten glass 10 and having an electrically heated, platinum alloy bushing 12 attached to the bottom of the furnace. The bushing is provided with a series of orifices in the form of tips 11 through which the glass flows and forms in small inverted cones suspended from the bottoms of the tips 11. The tips are usually formed in a number of rows, for example, four to 20 or more rows, having a great many tips in each row so that the total number of tips is about 400 to 800 or even more in number.

Glass fibers 20 are pulled from the cones of glass at a very high rate of speed, i.e., 5,000 to 20,000 feet per minute and wound up on a rapidly rotating, moisture permeable paper forming tube 23. The glass fibers are grouped into a strand 21 as they pass over the guide 22 prior to their being wound on the tube 23 mounted on rotating collet 24. As the strand is wound on the tube 23, it is rapidly traversed by means of a traverse 25. A cylindrical forming package 26 having a strand layer buildup of five-eighth to three-fourth inch in thickness is formed.

The size is applied to the individual filaments in the strand prior to the time they pass over the guide 22. The size is supplied to a reservoir 28 which has a rotating roller or belt 29 mounted so as to dip into a bath 30 of the size in the reservoir. The size is transferred from the rotating roller or belt to the filaments as the filaments pass over the surface of the wetted roller or belt. A suitable size applicator is shown in U.S. Pat. No. 2,873,718. Suitable sizes include dextrinized starch - vegetable oil sizes as well as those described in U.S. Pat. Nos. 3,167,468 and 3,277,192. Approximately 12 to 14 percent by weight of size is deposited on the strand.

After each forming package containing, for example 14 and 16 pounds of G-75 strand (400 filaments each having a diameter of 0.00036 inch) is formed, it is removed from the winder and the end of the strand is found. The forming packages are then mounted on a rack 31 and the rack is positioned in vacuum chamber 32 as illustrated in FIGS. 2 and 3. The rack 31 contains sufficient means to support enough forming packages to mount on a single twist frame, i.e., about 88 forming packages. The forming packages contain about 10 to 12 percent moisture based upon the weight of the strand and size when mounted on rack 31 preparatory to conditioning. The rack 31 is mounted on air float supports which greatly reduce the friction between the heavy rack 31 and the floors of the factory and the vacuum chamber. The rack can thus be pushed or slid into the chamber by a factory worker without requiring assistance from mechanical lifting apparatus. The rack is described in further detail in pending application Ser. No. 672,211 filed Oct. 2, 1967 now U.S. Pat. No. 3,468,434 and assigned to applicant's assignee. Instead of a rack 31 as above described, suitable movable trucks 34 mounted on rollers can be moved in and out of the vacuum chamber 32.

The vacuum chamber is provided with a vacuum pump 38 located on the top of the chamber. The air within the chamber is evacuated from a location near the bottom of the chamber through line 39 by the pump 38. A more uniform temperature is maintained inside the chamber when the opening in line 39 is located near the bottom of the chamber. The pump is vented to the atmosphere through condenser 40 and line 41. A suitable condensate line 42 carries off water which condenses in the condenser. The vacuum chamber 32 is also provided with an air return line 43 which is controlled by valve 45.

The interior of vacuum chamber 32 is radiantly heated by steam heated pipes or coils 46 which line the walls and ceiling of the chamber and which also are arranged vertically down the center of the chamber in order to radiate heat to the surfaces of the forming packages and prevent freezing of the water in the packages as the pressure within the chamber is reduced. The steam is provided through line 47 which is controlled by valve 48. Suitable condensate lines (not shown) are provided to carry off water which condenses in the steam lines.

When the rack bearing the forming packages is moved into the vacuum chamber, the doors 35 are closed and the temperature of the forming packages within the chamber is raised to about 150° to 200° F. over a period of 20 to 30 minutes by the transfer of heat from coils 46. The pressure within the chamber is then reduced by vacuum pump 38 by about 27 inches of mercury in 20 to 30 minutes. Since the air has been evacuated from the chamber, there is no problem of uneven drying of the packages such as frequently results in conventional drying where hot air currents cause uneven drying from side to side in a single forming package as well as uneven drying from package to package.

The strand is conditioned for various periods of time depending upon the dimensions of the individual strand and of the strand forming package. This reduces the moisture content to at least about 3 to 5 percent by weight based upon the weight of the strand and size and as low as 0 to 1 percent, preferably below 0.2 percent for strand to be formed into roving. This removal results in uniformly reducing all of the strand in all of the forming packages to substantially the same relatively low level of moisture. The temperature and pressure are programmed automatically by means of a suitable cam and other conventional controls 49. A sensitive vacuum pressure measuring device 50 which provides an indication of a small change in vacuum pressure in the range of 23 to 60 millimeters of mercury from absolute is included, as a measuring and control device.

The strand is then twisted as shown in FIG. 4 on conventional twist frames 51. The twister tube packages 52 are mounted on vertical support member 54. The strands are led from the forming packages downwardly around tension rollers 56 and through guides 57 to be wound on rotating twister tubes 58. Travelers riding around the tube packages 52 contribute to the twisting of the strand. The tube packages 52 are mounted on vertical spindles rotated by belts 64 running over pulleys on drive shaft 67.

Some of the water evaporates from the strand as it moves downwardly past the tension rollers 56 and the guides 57. A major portion of the moisture is lost as the strand balloons and swings around the twister tube package 58 in following the traveler 60. The remaining 2 percent or less of water is sufficient to promote proper and timely setting of the size and the formation of a well integrated, twisted yarn having a uniform solid size component of about 1.5 percent by weight of the strand and size throughout the length of yarn on the twister tube. The yarn hangs firmly on the twist package. Fabrics are easily woven from such twisted yarn and heat cleaned fabrics are free from streaks and broken filaments.

Description of Preferred Embodiments

EXAMPLE I

In a typical example of the practice of the invention, a plurality of strand forming packages of G-75's are dried in vacuum chamber 32. The strands are sized with a starch size as described in Example I in U.S. Pat. No. 3,227,192. The temperature of the atmosphere in the chamber 32 is elevated to a temperature of 180° F. and the pressure of the air in the chamber is reduced to about 28 inches of mercury vacuum. The forming packages are retained in the chamber under such conditions for about 6 to 7 hours. This is sufficient to reduce the moisture level of the strand on the forming packages to a uniform level of 4 percent by weight based upon weight of the strand and size.

The conditioned strand forming package is then removed from the chamber, mounted on a standard twist frame 50 and twisted according to conventional practices in a twisting room maintained at conventional twisting atmospheric conditions, i.e., 76° to 78° F. dry bulb temperature, atmospheric pressure, and 50 to 65 percent relative humidity. The yarn is not wild, is free from broken filaments, is acceptable as far as size distribution (nonmigration) is concerned, does not slough off the yarn package, and can be further twisted (plied) with other yarns and/or woven into fabrics without fuzzing.

EXAMPLE II

Typical results of the invention are set forth in the Table below. These results are obtained by comparing forming packages of G-37's and G-75's wound on a moisture permeable paper forming tube. The forming package is 12 inches long and has an inside diameter of about 12 inches and an outside diameter of about 13½ inches. The time required to obtain an average forming package moisture level of 4 percent by the process of the present invention is compared with the time required for the same conditioning according to the prior art in an atmospheric pressure, factory conditioning room having circulating air (160° F., 60 percent relative humidity). The conditioning tests start with forming packages containing about 12 percent moisture based on the weight of the forming package for G-37's and 11 percent for the G-75's. The data for the present invention is set forth in column A and for the prior art practice in column B. The forming packages all have the same forming size.

TABLE

| Strand Description | Time (Hours) | |
|---|---|---|
| | A (Invention) | B (Prior art) |
| G-37's | 18 | In excess of 120 |
| G-75's | 8 | 60 |

In addition, the moisture level throughout the forming packages conditioned as in A and B above is materially different. This is shown in the graph in FIG. 5. The moisture level in the forming package conditioned in the vacuum chamber is shown in curve A. It is relatively constant throughout the forming package with a slight tendency for a higher moisture content in the center of the forming package. On the other hand, as shown in curve B, the moisture level of the strand in the forming package conditioned according to the prior art varies from about 1 percent on the outside of the package to about 7 percent at the inside. This is because the forming package conditioned under vacuum dries from the inside as well as the outside whereas the other forming package dries only from the outside.

The slightly higher moisture level in the interior of the vacuum conditioned yarn is not harmful especially when a single forming package is employed to produce two tubes of twisted yarn. This is one of the objectives in producing the larger forming packages. The slightly higher moisture level occurs at the end of the first doff and at the beginning of the second doff. Thus, the outside of the first package of yarn has a slightly higher moisture level which evens out by normal moisture loss from the outside layers of yarn. The moisture in the outside of the forming package after the first doff (formerly the central portion) will tend to level out while the forming package is exposed on the twister frame between doffs (approximately 2 or more hours).

The tendency for size migration during conditioning is greatly reduced by practice of the present invention. Since the cylindrical forming package dries from both the interior cylindrical surface as well as the exterior cylindrical surface, the tendency for migration is much less than when the drying is from the outside cylindrical surface only. This ensures elimination of migration with the specially formulated starch-oil sizes which have been developed to overcome this problem and also permits use of some of the simpler starch size and roving size formulations which exhibit size migration tendencies when conditioned according to the prior art.

EXAMPLE III

A plurality of strand forming packages of K-37's (400 fibers per strand) having a roving size as described in U.S. Pat. No. 3,249,412 are placed in vacuum chamber 32. The temperature of the chamber is raised to a temperature of 270° F. over a period of 30 minutes and then the chamber is evacuated to a vacuum pressure of 2.0 inches of mercury from absolute over a period of 30 minutes. This vacuum pressure is noted on device 50. Prior to this, the vacuum pressure in the vacuum chamber at 270° F. without any forming packages is noted on the vacuum pressure device to be 1.50 inches of mercury from absolute vacuum. This represents the vacuum pressure in the particular chamber at a condition when substantially no moisture is present in the chamber. This also represents the vacuum pressure in the chamber when the forming packages are essentially dry, for example, when they contain 0.5 percent by weight of moisture or lower, i.e., preferably 0.1 percent by weight of moisture.

The vacuum pump is retained at the same setting and the temperature is maintained at 270° F. throughout the drying run. Rather than conduct the conditioning for a predetermined period of time as described in Example I, the length of the run can be determined by noting the gradual change in vacuum pressure on the vacuum pressure device 50. When the device indicates a pressure close to or at the previously determined minimum setting for dry conditions, the forming package is considered to be essentially dry.

EXAMPLE IV

The procedure of Example III is followed with the exception that as soon as the moisture is removed from the forming package, air is bled back into the vacuum chamber until the pressure reaches atmospheric pressure. The roving packages are then heated at 270° F. in the chamber 32 or in another hot air oven to bake the packages and to flow or cure the binder and/or fix the coupling agent on the glass fiber surfaces. The combination of (1) vacuum drying and (2) baking at atmospheric pressure of forming packages eliminates any tendency for size migration and reduces the amount of time required overall to dry and bake the forming packages which contain strand which is to be used for resin reinforcement.

FIG. 6 is a graph with curves which show how the vacuum pressure and moisture level varies during the course of the conditioning run. The vacuum pressure is highest at the beginning of the run when the moisture content in the atmosphere in the chamber is highest. As the packages are dried, the moisture content lowers and the vacuum pressure lowers. The vacuum drying portion of the run described in Examples III and IV is indicated as being over when the vacuum pressure reaches the level which represents no moisture in the vacuum chamber. The use of the vacuum pressure to indicate level of conditioning gives a more precise determination of the level of conditioning and the end of the run than the use of a predetermined time period. It eliminates any extra conditioning which has heretofore been employed to ensure complete drying.

The vacuum pressure device can also be used for determining when the conditioning runs for Examples I and II are over. By predetermined calibration, curves are obtained for each chamber and each type of forming package (fiber diameter, forming size, and package build and weight). These curves show the moisture level in the package at a given vacuum pressure. The conditioning run is thus continued until the vacuum pressure drops to the point on the curve which corresponds to the desired moisture level in the strand in the package. During operation the location of the process on the curve is determined by shutting off vacuum pump and allowing the vacuum pressure reading to rise and become steady. The vacuum pump is then started and the vacuum pressure reading returns to an operating level curve for the vacuum pressure which lies in between the dry (empty chamber) curve and the actual moisture level curve. Thus, the actual plot of the recording instrument (not shown) shows the vacuum pressure curve with a series of blips on it, the high points of the blips lying on the actual moisture level curve.

The present invention greatly improves the economics of glass fiber yarn production. It reduces the time required for conditioning the yarn. This, in turn, eliminates the need for some of the factory space presently required for conditioning of strand forming packages. In addition, it eliminates the need for some of the trucks or racks that would be required to support the greater number forming packages that must be held for the longer conditioning periods.

Although the present invention has been described with respect to specific details of certain embodiments thereof, it is not intended that such details serve as limitations upon the scope of the invention except insofar as set forth in the following claims.

I claim:

1. In the method of forming glass fiber strand which comprises forming individual continuous glass fibers from molten glass, applying an aqueous forming size to the individual fibers, said size being composed of water as the principal ingredient together with a binder, combining the fibers into a strand, winding the strand on a forming tube to form a cylindrical forming package, conditioning the strand for further fabrication by reducing the moisture in the forming package, removing the strand from the tube and converting the strand into other forms such as chopped strand, roving, yarn, cord, mat and fabric, the improvement which comprises conditioning the strand forming package by placing said package in a chamber, closing said chamber, reducing the gaseous environment within said chamber to subatmospheric pressure while radiantly heating said package from a radiant heat emitting source, the heating and drying rates being correlated so that a temperature above the freezing temperature of the moisture in the package but below the temperature at which the nonaqueous size ingredients are chemically degraded is maintained and the cylindrical forming package dries from both the interior cylindrical surface as well as the exterior cylindrical surface to keep migration of size to a minimum.

2. The method of claim 1 whereby the moisture on the strand in the forming package after conditioning is at a substantially uniform level throughout the forming package.

3. The method of claim 1 wherein a plurality of forming packages are conditioned in the manner set forth so as to substantially reduce the moisture on the strand in the forming packages to a uniform low level of moisture in each forming package.

4. The method of claim 1 wherein the strand forming package is postconditioned in a heated environment.

5. The method of claim 1 wherein the vacuum maintained within the chamber is at least 20 inches of mercury.

6. The method of claim 1 wherein the forming tube is a moisture permeable paper tube.

7. The method of claim 1 wherein the strand contains at least 400 individual fibers.

8. The method of claim 7 wherein the diameter of the individual fibers is at least 0.0002 inches.

9. The method of claim 8 wherein the thickness of at least a portion of the forming package is at least five-eighth inch.

10. The method of claim 1 which further includes the steps of periodically measuring the subatmospheric pressure of said gaseous environment while the moisture content of the package therein progressively decreases and the subatmospheric pressure in said environment progressively increases until the moisture content of the package reaches a desired level, then removing the package from said environment.

11. In the method of forming glass fiber strand which comprises forming individual continuous glass fibers from molten glass, applying an aqueous forming size to the individual fibers, said size being composed of water as the principal ingredient together with a binder, combining the fibers into a strand, winding the strand on a forming tube to form a cylindrical forming package, removing the strand from the tube and converting the strand into other forms such as chopped strand, roving, yarn, cord, mat and fabric, the improvement which comprises conditioning the strand forming package by preheating said package at an elevated temperature below that at which the nonaqueous size ingredients are chemically degraded, lowering the gaseous atmosphere within a chamber enclosing said package to subatmospheric pressure while radiantly heating said package from a radiant heat emitting source, the heating and drying rates being correlated so that a temperature above the freezing temperature of the moisture in the package but below the temperature at which the nonaqueous size ingredients are chemically degraded is maintained and the cylindrical forming package dries from both the interior cylindrical surface as well as the exterior cylindrical surface to keep migration of size to a minimum.

12. The method of claim 11 which further includes the steps of periodically measuring the subatmospheric pressure of said gaseous atmosphere while the moisture content of the package therein progressively decreases and the subatmospheric pressure of said atmosphere progressively increases until the moisture content of the package reaches a desired level, then removing the package from said atmosphere.